United States Patent Office

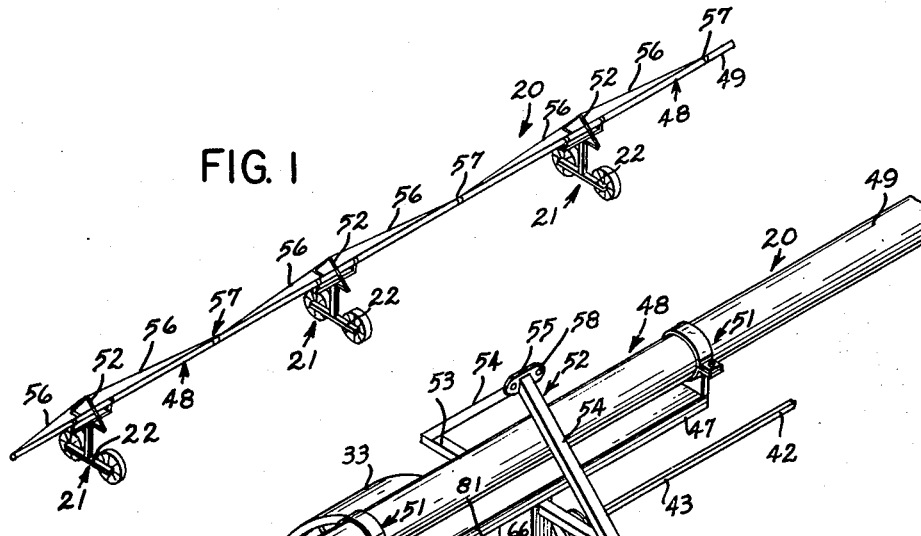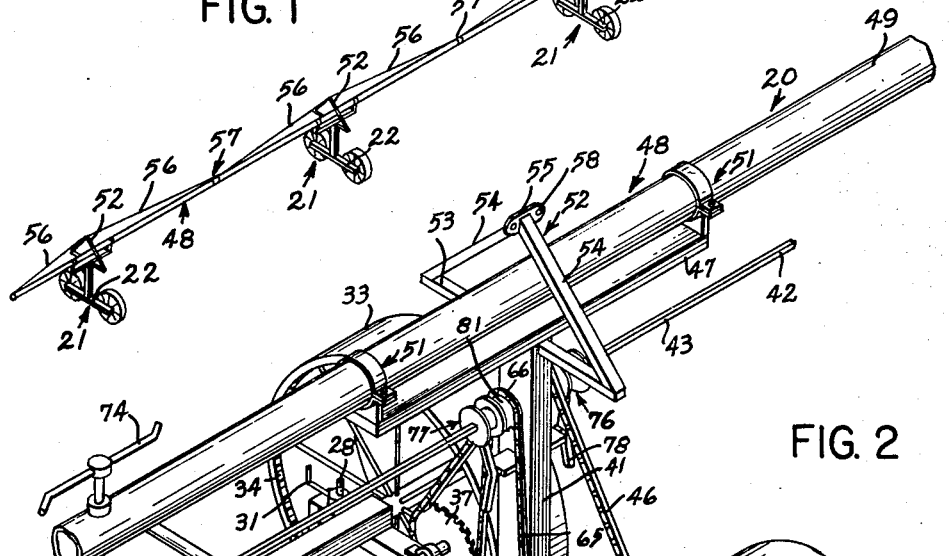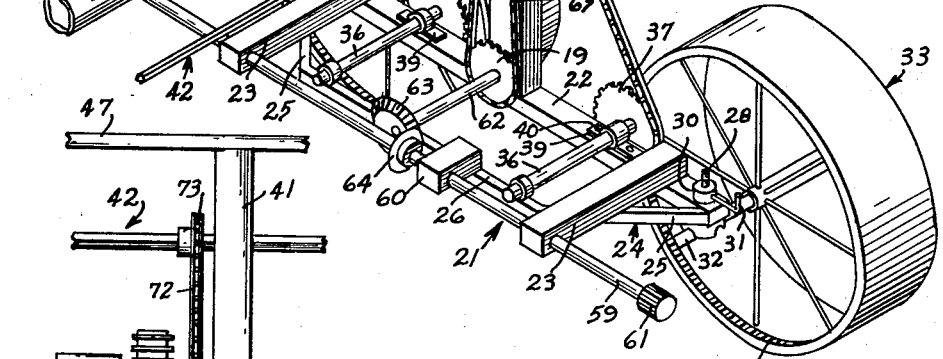

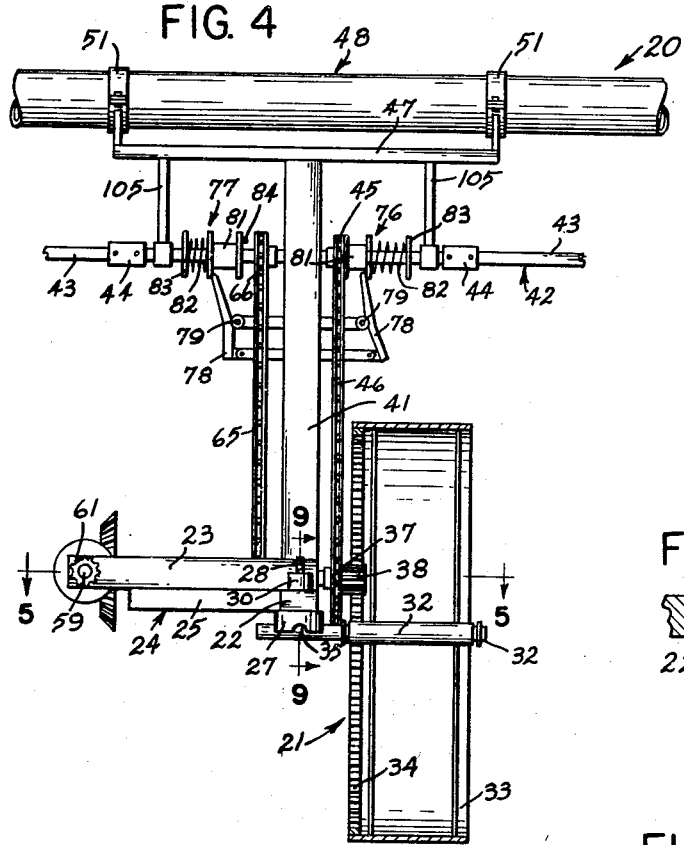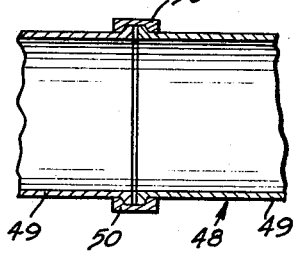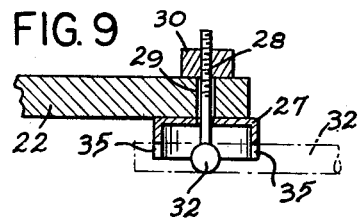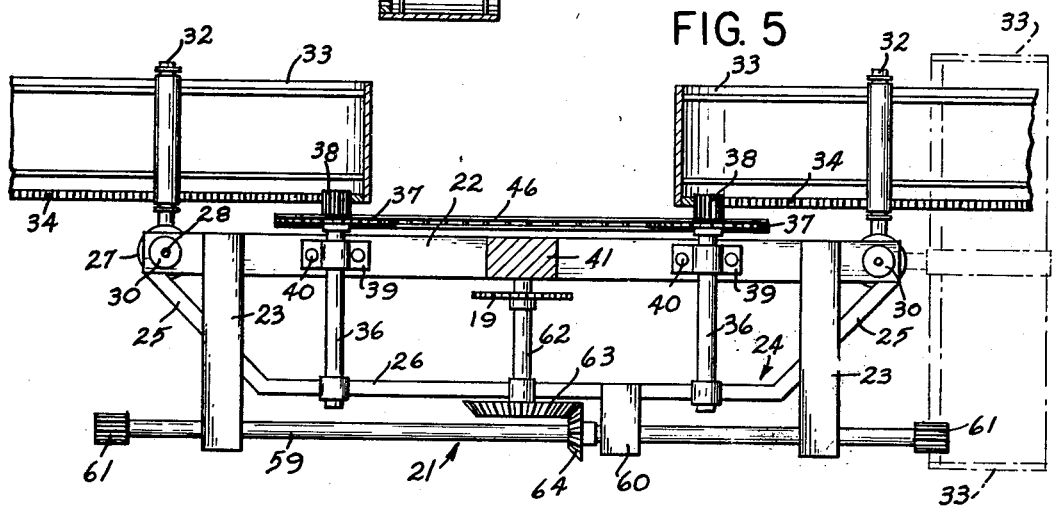
INVENTOR
DELBERT M. HEFNER
ALBERT C. SEAY
BY Sherman Levy
ATTORNEY March 3, 1970  D. M. HEFNER ET AL  3,498,542
SELF-PROPELLED SPRINKLER
Filed Feb. 1, 1968  3 Sheets-Sheet 3
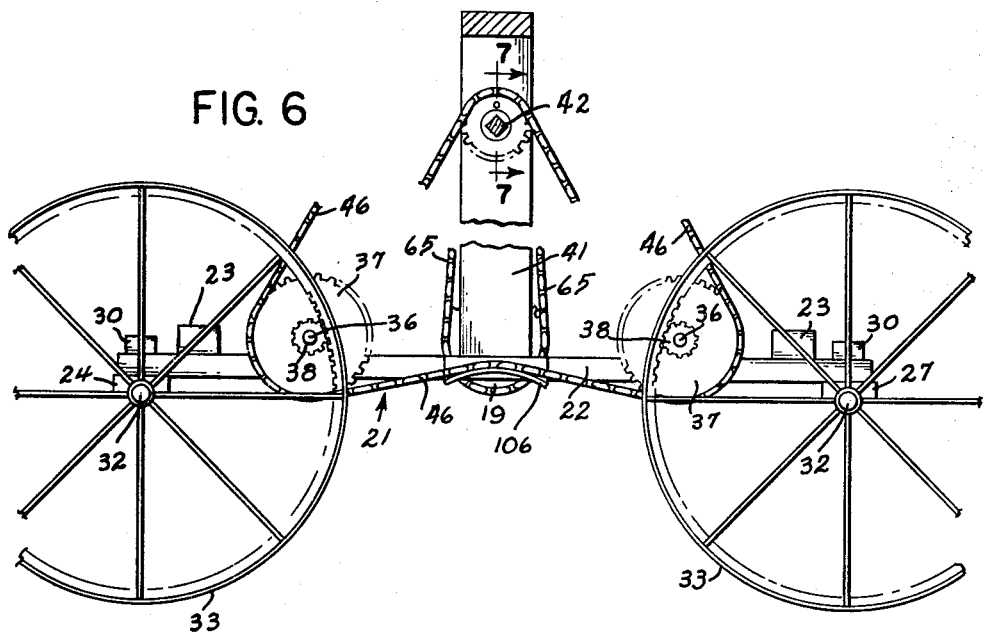
FIG. 6
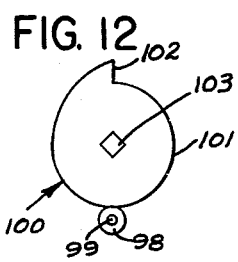
FIG. 12
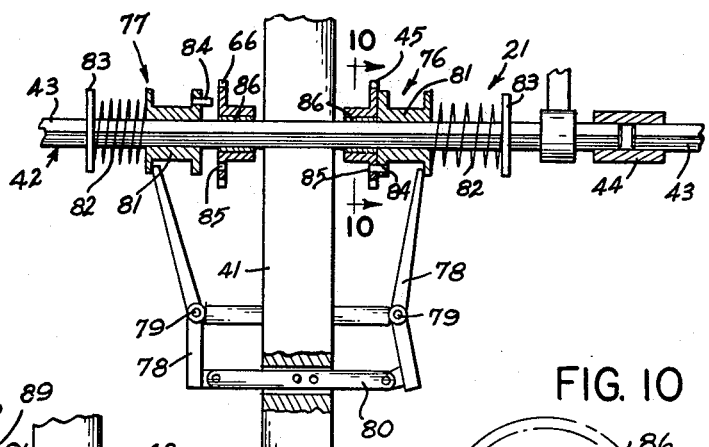
FIG. 7
FIG. 10
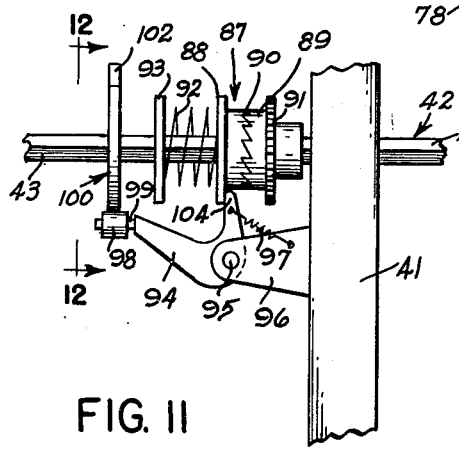
FIG. 11
INVENTOR
DELBERT M. HEFNER
ALBERT C. SEAY
BY Sherman Levy
ATTORNEY

3,498,542
Patented Mar. 3, 1970

3,498,542
SELF-PROPELLED SPRINKLER
Delbert M. Hefner, P.O. Box 51, and Albert C. Seay, P.O. Box 314, both of Carrizozo, N. Mex. 88301
Filed Feb. 1, 1968, Ser. No. 702,371
Int. Cl. A01g 25/02
U.S. Cl. 239—212           1 Claim

ABSTRACT OF THE DISCLOSURE

A self-propelled sprinkling system or mobile irrigation system wherein a sprinkler pipe will be moved across agricultural land in a highly efficient manner to use and control the water in the most advantageous manner, and wherein the sprinkler can also be used for liquid soil conditioner, weed killer and the like.

BACKGROUND OF THE INVENTION

Field of the invention

The present invention pertains to the field of fluid sprinkling, spraying and diffusing as defined in Class 239, subclasses 146, 159 and 179, and Class 61, Hydraulic and Earth Engineering, subclass 12.

Description of the prior art

The prior art includes the following prior patents: 1,068,796, 1,321,350, 2,726,895, 3,009,645, 3,202,361.

Some of the differences or advantages that the present invention has over these prior patents is as follows:

An irrigation pipe consisting of a plurality of sections or units which are detachably connected together are mounted on wheel units which are power driven, sprinkler heads are spaced at regular intervals so that water can be distributed over the desired area of land. The sprinkling system of the present invention will operate or move under its own power over various kinds of soil or terrain, and wherein the sprinkling system will move in a straight line or direction or in a circular direction over fields having an irregular shape or configuration.

SUMMARY OF THE INVENTION

In accordance with the present invention, there is provided a self-propelled sprinkling system which is adapted to be mounted on tracks, wheels or the like so that water can be effectively and efficiently distributed over farm land, crops or the like, and wherein the present invention can also be used for dispensing or distributing various chemicals such as weed killer and liquid soil conditioners, the sprinkler being power driven or operated and wherein the device is self-propelled, there being a means provided which permits certain of the parts to be adjusted to different positions or separated as desired or required.

In addition, there is provided an apparatus of the character described that is relatively economical to manufacture and efficient in operation and which is rugged in structure and conducive to the most economical use of materials and uniformity of members formed therefrom.

BRIEF DESCRIPTION OF THE DRAWINGS

FIG. 1 is a perspective view illustrating the present invention.

FIG. 2 is an enlarged perspective view illustrating certain constructional details of the present invention.

FIG. 3 is a fragmentary side elevational view illustrating one of the wheel units with the drive mechanism therein.

FIG. 4 is a fragmentary elevational view of a portion of the structure of FIG. 2 with parts broken away for clarity of illustration.

FIG. 5 is an enlarged sectional view taken on the line 5—5 of FIG. 4.

FIG. 6 is a fragmentary side elevational view of a portion of the structure of FIG. 2.

FIG. 7 is an enlarged sectional view taken on the line 7—7 of FIG. 6.

FIG. 8 is an enlarged sectional view taken through the water pipe or sprinkler pipe and illustrating the joining of the sections of the pipe.

FIG. 9 is an enlarged sectional view taken on the line 9—9 of FIG. 4.

FIG. 10 is an enlarged sectional view taken on the line 10—10 of FIG. 7.

FIG. 11 is a fragmentary side elevational view illustrating a modification.

FIG. 12 is a sectional view taken on the line 12—12 of FIG. 11.

FIG. 13 is a view generally similar to FIG. 6 but illustrating a modified form of drive mechanism.

DESCRIPTION OF THE PREFERRED EMBODIMENT

Attention is directed to the drawings, and more particularly to FIGS. 1–10 of the drawings, wherein the numeral 20 indicates the self-propelled sprinkler of the present invention which comprises a plurality of spaced apart stations or units 21 which each have generally the same construction and wherein each includes a horizontally disposed frame member 22 which has a pair of brace members 23 at right angles with respect thereto and which are secured thereto in any suitable manner as, for example, by means of welding. A frame element 24 is also provided and the frame 24 includes angularly arranged end portions 25 that are suitably secured or affixed to the end members of the frame 22, FIG. 2.

As shown in the drawings, swivel rings 27 are mounted below the ends of the frame member 22, FIG. 9, and securing elements 28 serve to connect the rings to the frame member 22, the securing elements or bolts 28 extending through suitable apertures or openings 29 in the frame member 22. A fastener or nut 30 is adapted to be arranged in threaded engagement with the upper threaded portion of each securing element 28, and the fastener 30 may have a handle member 31 suitably affixed thereto for facilitating manual rotation or turning thereof. The rings 27 are provided with a plurality of spaced apart arcuate grooves 35 for a purpose to be later described. The numeral 32 indicates axles which are suitably secured as by welding to the lower ends of the securing elements 28, and the axles 32 are adapted to selectively engage or be received in certain of the grooved portions 35. A wheel 33 is rotatably mounted on each axle 32 as shown in the drawings, and each wheel 33 has an internal gear element or internal gear 34. There is further provided for each station 21 a pair of spaced parallel horizontally disposed drive shafts 36 which has sprocket members 37 mounted thereon and gear members 38 are integral with the sprocket members 37, the gear member 38 being adapted to selectively mesh with the internal gear elements 34 of the wheels 33. The shafts 36 are adapted to extend through adjustable sliders or supports 39 which may be connected to the parts such as the frame member 32 as by means of securing elements 40.

The numeral 41 indicates a vertically disposed column or riser which has its lower end affixed to the intermediate portion of the frame member 22, and a horizontally disposed elongated jack shaft 42 extends through the riser 41, and the jack shaft 42 consists of a plurality of separate shaft sections 43 which may be coupled or connected together as at 44. Sprocket elements 45 are mounted on the jack shaft 42, and an endless chain 46 is arranged over the sprocket element 45 and around the sprocket members 37. The chain 46 may have a safety guard contiguous or adjacent thereto.

Further, there is provided a horizontally disposed header bar 47 which is connected to the upper end of the riser 41, and an elongated horizontally disposed sprinkler pipe 48 is arranged over the header bar 47, FIGS. 2 and 4. The pipe 48 consists of a plurality of individual pipe sections 49 which are detachably connected together by a suitable member such as a collar or coupling 50, FIG. 8. Clamps 51 are provided for detachably connecting the sprinkler pipe 48 to the header bar 47, as shown in the drawings. The numeral 52 indicates a cable tower which is connected to the upper end of the riser 41 and the cable tower 52 may have a generally triangular configuration and includes members or elements such as the elements 53 and 54 which are suitably joined together, and a bracket 53 is affixed to the upper end of the tower 52. The bracket 55 may have apertures or openings 58 therein whereby cables or lines 56 can have end portions suitably affixed to the brackets 55, and the opposite ends of the cable 56 are adapted to be anchored to the sprinkler pipe 48 and jack shaft 43 by means of anchor units 57.

The numeral 59 indicates a horizontally disposed shaft member which has its longitudinal axis arranged parallel to the frame member 22 and the shaft member 59 may be supported in bearings arranged in the brace members 23 as well as in the brace members 60. Gear members 61 are mounted on the ends of the shaft member 59 for selective engagement with the internal gear elements 34 of the wheels 33. The drive shaft 62 has a bevel gear 63 on one end thereof which meshes with a bevel gear 64 on the shaft member 59. The drive shaft 62 also has a sprocket 19 thereon and an endless chain 65 is trained over the sprocket 19 and the chain 65 also engages a sprocket 66 on the jack shaft 42.

As shown in FIG. 3, one or more of the stations or mobile units 75 may have a platform suitably affixed thereto and supported by braces 68 and a conventional motor or engine such as a gasoline engine 69 may be supported on the platform 67. The engine 69 serves to rotate a shaft 70 which has a sprocket 71 thereon and an endless chain 72 is arranged in engagement with the sprocket 71 and the chain 72 also engages a sprocket 73 on the jack shaft 42. The sprinkler or irrigation pipe 48 may have a plurality of spaced apart sprinkler heads 74 connected thereto, and the sprinkler heads 74 are adapted to have water or liquid chemicals discharged therefrom on to the land or area to be treated.

As shown in the drawings, there is provided for each of the stations 21 a pair of release mechanisms 76 and 77 and because the construction of these release mechanisms is generally the same it is thought that a description for one will suffice for all. Each of these release mechanisms includes a lever 78 which is pivotally and operatively connected to the riser 41 as at 79, FIG. 4. Linkage 80 is adapted to be provided for connecting the levers 78 together, FIG. 7. Collars 81 are movably mounted on the jack shaft 42 for engagement by the upper ends of the levers 78, there being coil springs 82 circumposed on the jack shaft 42 and the coil springs 82 are interposed between the outer end portions of the collars 81 and shaft retainers 83. Pins 84 are carried by or affixed to the collars 81 and the pins 84 are adapted to engage apertures or openings 85 in the sprockets such as the sprockets 66 or 45. As shown in FIG. 10, sprockets such as the sprockets 45 have bearings 86 arranged in the hub or central portion thereof and the bearings 86 engage the pack shaft 42.

Referring now to FIGS. 11 and 12 of the drawings, there is illustrated a modification for use when the sprinkler is traveling in a circular path or the like. In this modification or form of the invention there is provided a slip clutch 87 which consists of separate parts or elements 88 and 89 that have interengaging teeth 90 thereon. The element 89 has a sprocket 91 integral therewith. The numeral 92 indicates a coil spring which is circumposed on a portion of the jack shaft 42, and the coil spring 92 is interposed between the element 88 and the retainer 93 that is fixed on the jack shaft.

The numeral 94 indicates a rocker which is pivotally connected to a support 96 on the riser 41, and the pivotal support for the rocker 94 is indicated by the numeral 96, there being a spring member 97 suitably connected to a portion of the rocker 94 for biasing or urging the rocker 94 in the proper direction. The roller 98 is connected to an end of the rocker 94 as at 99 and the roller 98 is adapted to be engaged by a cam 100 which is mounted on the jack shaft. As shown in FIG. 12, the cam 100 includes an outer edge portion 101 as well as a shoulder portion 102.

As shown in the drawings, a field, farm of the like is adapted to be supplied with the desired or proper quantity of water or other liquids such as soil conditioner, weed killer or the like. The parts can be made of any suitable material and in different shapes or sizes.

It is to be noted that when the device is being used that the elongated irrigation pipe or sprinkler pipe 48 is arranged in a horizontal position, and this pipe may receive water or liquid from any suitable source of supply such as a well, hose or the like. The elongated pipe 48 is supported by a plurality of spaced apart wheeled stations or units 21 so that the sprinkler can travel along the field in the desired manner.

One or more of the wheeled units or stations such as the station 75 may have a power source thereon such as the engine 69 so that the entire device will be self-propelled and will move along the ground or field in the proper manner.

With further reference to the power mechanism shown in FIG. 3 on the station 75, it will be seen that when the engine or motor 69 is operated that it will result in rotation of the shaft 70 which will turn the sprocket 71, and this will cause corresponding rotation of sprocket 73 on the square-shaped jack shaft 42 due to the provision of the endless chain 72 that is trained over the sprockets 71 and 73. Because the sprocket 73 is suitably affixed to the jack shaft 42 it will thereby provide power for operating or moving all the various pluralities of mobile units or stations 21.

In addition, the wheels 33 will be rotated due to the provision of the previously described structure. For example, with the parts in the position of FIG. 2, as the jack shaft 42 rotates, the chain 46 will be moved due to the fact that the chain 46 is arranged in engagement with the sprocket 45 on the jack shaft 42, and as the chain 46 is moved it will cause corresponding movement of sprockets 37 on each station 21. Each of the sprockets 37 has the gear 38 integral therewith, and with the wheels 33 in the position of FIG. 2 the gears 38 are arranged in meshing engagement with the internal gear portions 34 of the wheels 33 so that it will be seen that wheels 33 will be rotated or driven in the desired manner. This driving movement of the wheels 33 takes place when the parts are in the position of FIG. 7.

In addition, there is provided the means for imparting rotation or driving forces to the wheels 33 when these wheels 33 are in position at right angles to that shown in FIG. 2. The drive arrangement for the wheels 33 when in a position at right angles to that shown in FIG. 2 is as follows: Power is supplied again from the jack shaft 42, and in this latter instance the power is transmitted from the sprocket 66 through the chain 65 to the sprocket 19 which causes rotation of shaft 62 whereby the bevel gear 63 will turn and, inasmuch as the bevel gears 63 meshes with the bevel gear 64, it will be seen that this will cause the desired rotation of the shaft 59. Because the shaft 59 has the gear 61 on the ends thereof, it is to be noted that with the wheels 33 in the dotted line position shown in FIG. 5, the gears 61 mesh with the gear portions 34, so that the wheels 33 will be rotated in the proper manner.

The wheels 33 are held in their proper position by means of the previously described structure including the swivel rings 27, bolts 28 and fasteners or nuts 30. Thus, as shown in FIG. 2 for example, the axles 32 of the wheels 33 are arranged at right angles respective, to the frame member 22, and with the nuts 30 tightened on the bolts 28, the wheels will be maintained or retained in this position. However, when it is desired to move the wheels 33 to a position 90 degreee from that shown in FIG. 2 it is only necessary to manually loosen the nuts 30 by means of the handle members 31 which are affixed to the nuts 30, and the nuts 30 can then be loosened on the threaded portions of the bolts 28 so that, for example, the bolts 28 and axles 32 can be shifted whereby, for example, the axles 32 can be shifted from the sold line position of FIG. 9 to the broken line position of FIG. 9. After the axles and wheels have been shifted to their desired locations, the nuts 30 are again tightened by means of the handle members 31 so that the wheels will be maintained in their proper adjusted position. It is to be noted that the lower ends of the bolts 28 are secured as by welding to the upper surfaces of the axles 32. In addition, the swivel rings 27 have the arcuate recesses or grooved portions 35 therein and these grooved portions 35 will receive therein the axles 32 so that the axles 32 will not accidentally shift or move out of their proper location after the nuts 30 are tightened.

Furthermore, it is to be noted that water or other liquid is adapted to be supplied from a suitable source of supply such as a pond, well, hose or the like, and this water or other liquid enters the elongated pipe 48. Suitable sprinklers 74 may be arranged at spaced apart points along the pipe 48 so that the water or other liquid can discharge out through the sprinklers 74 to irrigate or water the land or crops in the desired manner. The sprinklers 74 may be of the rotary type so that all of the area will be watered or sprinkled in the desired manner. The pipe 48 consists of a plurality of similar sections 49 which are adapted to be arranged in end to end relation with respect to each other, and these pipe sections 49 are adapted to be coupled or joined together with suitable unions or couplings such as the couplings 50 shown in FIG. 8. When it is desired to separate one or more of the pipe sections from each other the couplings 50 are of the type that permits the couplings 50 to be readily disengaged from the pipe 48 so that the sections 49 can be separated from each other. The pipe 48 is supported on the header bars 47 as shown in the drawings, and clamps 51 serve to maintain the pipe 48 in proper position above the header bars 47. The clamps 51 are of the type that can be readily disconnected as, for example, when portions of the pipe are to be removed or replaced on the stations 21. In addition, as a further support for the elongated pipe 48 there is provided cables 56 which have end portions thereof connected to the bracket 55 on the upper end of the towers 54, and the opposite end portions of the cable 56 are connected to the pipe 48 by means of anchors 57. These anchors 57 are also adapted to provide a support for the elongated jack shaft 42.

With further reference to the release mechanisms 76 and 77, attention is directed to figures such as FIGS. 2, 4 and 7 of the drawings. It will be seen that the levers 78 are pivotally connected to the riser 41 as at 79, and the lower portions of the levers 78 are connected to each other as, for example, by means of linkage 80 so that when the chain 65 is in driving position, the chain 46 will be out of driving position, and similarly when the chain 46 is transmitting power from the jack shaft 42 to the wheels 33, then the chain 65 is not transmitting power. The structure and operation of these release mechanisms are such that the collars 81 can shift or move on the jack shaft 42, and the spring members 82 exert pressure on the collars 81 to bias or urge the collars in the proper direction. The collars 81 are provided with the integral pins 84 for selective engagement with the apertures 85 in the sprockets 66 or 45. As shown in FIGS. 7, with further reference to the release mechanism 77, it will be seen that the pin 84 for the release mechanism 77 is not in engagement with the aperture 85 so that the release mechanism 77 is not supplying power from the jack shaft 42 to the sprocket 66. However, it will be seen that the release mechanism 76 is in operative position at this time, and the pin 84 of the release mechanism 76 engages the corresponding aperture 85 in the sprocket 45 so that power will be transmitted from the jack shaft 42 to the sprocket 45, and this power will then be transmitted from the sprocket 45 through the chain 46 through the sprockets 37, then through the gears 38 to the wheels 33 by means of the gear portions 34.

Attention is further directed to the modification of FIGS. 11 and 12 wherein it will be seen that a cam such as the cam 100 is adapted to be mounted on the jack shaft 42, and the cam 100 has a square-shaped opening 103 in the central portion thereof for snugly receiving therein a portion of the square-shaped jack shaft 42 so that as the jack shaft 42 is rotated by the engine 69, the cam 100 will rotate whereby the outer edge portion 101 and the shoulder portion 102 will selectively engage the roller 98 to pivot or move the rocker 94 through the pin 95 and as the rocker 94 is pivoted or moved, the end portion 104 of the rocker 94 will alternately or selectively engage the element 88 to compress the spring 92 and selectively separate the teeth 90 of the elements 88 and 89 from each other. The sprocket 91 is adapted to be used in lieu of or in place of a sprocket such as the sprocket 66. The arrangement of FIGS. 11 and 12 is adapted to be used as, for example, when the sprinkler is traveling in a circular path.

As shown in FIG. 4, braces or supports 105 can be used to help support the header bar 47 in the desired location at the top of the riser or column 41.

It will therefore be seen that there has been provided an irrigating apparatus wherein fields, farms or the like can be irrigated with water or a liquid chemical such as a soil conditioner, weed killer or the like can be sprayed or dispensed in the desired manner. The present invention is self-propelled and it travels a field in a straight line in one direction, and then when it is desired to change the direction of the irrigation apparatus the parts can be adjusted so that, for example, the irrigation device of the present invention can travel in a direction at right angles to the previous direction that was being traveled. This change in direction of the device is especially convenient or suitable as, for example, when the device reaches the end of a farm or field since by means of the present invention the direction of travel can be changed or fixed so that a different portion of the field can be irrigated or watered or treated. The present invention is especially suitable in watering or treating large fields or areas, and it will be seen that there has been provided a mobile sprinkler which includes a novel means for directing the water on to the desired areas for accomplishing the desired purposes. With the present invention crops can be treated or irrigated. In addition, the length of the sprinkler pipe 48 can be varied as desired depending upon the size of the field being watered or treated. Also, the number of units or stations 21 that are being used can be varied as desired or required. Braces or bearings or the like can be used wherever desired or required. The present invention can receive water or other liquid from any suitable source such as a pond, well, hose, pump or the like. In addition, with the present invention there is provided a means that permits certain of the parts to be readily disconnected from each other or connected together when a pole, tree stump or other obstacle is encountered and certain of the parts can be readily separated to permit the device to move past the obstacle, and the parts can be connected together again to permit normal continued use thereof.

When using the device one or more stations such as the station 75 shown in FIG. 3 is used along with certain of the other stations such as the stations 21, and the pipe 48 is supported in the previously described manner. Power from the engine 69 will result in rotation of the shaft 70 which will cause corresponding rotation of the jack shaft 42 by means of the chain 72 and its associated sprockets 71 and 73. The jack shaft 42 consists of a plurality of separate sections which are coupled together as at 44 so that when certain of the parts are to be separated the coupling 44 can be disconnected temporarily for the previously described reasons. With the wheels 33 in the position as shown in FIG. 2, for example, and with the engine 69 actuated it will be seen that power from the jack shaft 42 will be transmitted through the sprockets 45, then through the chain 46 to the sprockets 37 and, inasmuch as the gears 38 are integral with the sprockets 37 and because the gears 38 are in mesh with the gear portions 34 of the wheels 33, it will be seen that this will result in the rotation of the wheels 33 in the desired manner. When the chain 46 is receiving power from the jack shaft 42, the chain 65 is not receiving power.

When it is desired to cause the device of the present invention to travel in a direction at right angles to that being traveled in FIG. 2, it is only necessary to loosen the nuts 30 by means of the handle member 31 whereby the axles 32 can be shifted to a position at right angles from that shown in FIG. 2 so that, for example, the axles 32 will move from the solid line position of FIG. 9 to the broken line position of FIG. 9 and the nuts 30 will be tightened so that the wheels 33 will stop at a position at right angles to that shown in FIG. 2. At the same time levers 78 are adapted to be manually actuated or pivoted on their pivot supports 79 so that the release or clutch mechanisms 77 and 76 are shifted from a position such as that shown in FIG. 4 to a different position and this will cause the release mechanism 76 to become free-wheeling and at the same time the release mechanism 77 will be operated so that power from the jack shaft 42 will be transmitted from the sprocket 66 to the sprocket 19. This power will then be transmitted through the shaft 62 through the transmission bevel gears 63 and 64 to the shaft 59, and since at this time the gears 61 will be meshing with the gear portions 34 it will be seen that the wheels 33 will be driven when in this position.

When it is desired to separate the parts to clear an obstacle the shaft coupling 44 can be disengaged from the shaft section 43 to permit separation of the sections 43 at the desired point. In addition, couplings such as the couplings 530 can be disconnected from the pipe section 439 as shown in FIG. 8 so as to permit the sections to be separated from each other, and this will permit a pole, tree, stump or the like to be cleared, and the parts can be connected together after the obstacle is passed.

As shown in the drawings, the frame element 24 includes the straight portion 26 as well as the angularly arranged portions 25, FIG. 2.

When the elements are separated in the middle of a field to bypass a tree or other object the source of water supply is cut off and automatic drains in each joint of pipe let the water run out on the ground and then when the elements are reconnected the water source is started back. Since this will only have to be moved several feet at each location the sprinkler system will overlap that part, there is no need to keep water in the pipe. In some instances tracks may be attached to the wheels if desired or required.

It will therefore be seen that there has been provided a rolling rain unit which consists of a massive mobile irrigation system and the present invention includes an irrigation pipe that is cut to a specified length fed by a hose such as an aluminum extended hose. The pipe is mounted on a set of wheels which are power driven, and there are two distinct machines. Each machine is classified by the nature of the wheel structure. One machine is driven on a set of cushioned wheels driven by a gear system, and the second machine may be mounted on a narrow set of wheels and is chain driven.

The device can be driven along a field in a desired direction and at the end of the field or at any intermediate position. The location or position of the wheels can be adjusted to cause the device to travel in a different direction so that the device can be moved in directions 90 degrees relative to each other.

With further reference to the release mechanism 76 and 77, it is to be noted that each of these release mechanisms includes members carrying pins such as the pins 84 for selectively engaging the apertures 85 in the adjacent sprockets 45 or 66 so that the mechanisms 76 and 77 can either be in a free-wheeling position or else one of these mechanisms will be in a drive arrangement to permit power to be transmitted from the jack shaft to the wheels regardless of the position of the wheels.

In the modification of FIGS. 11 and 12, an intermittent operation can be accomplished, and for this purpose a toothed clutch 87 is used in conjunction with the cam 100 in order to cause selective separation or engagement of the teeth 70 of the elements 88 and 89 so that power from the jack shaft 42 can be selectively transmitted to the sprocket 89 in order to rotate the wheels. The sprocket 89 is adapted to take the place of a sprocket such as the sprocket 66.

In FIG. 6 the numeral 106 indicates an adjustment bar which can be used for adjusting the tension on a chain such as the chain 46. It will therefore be seen that there has been provided a self-propelled sprinkler that can be moved across farm land or pasture land or the like so that water can be used and controlled with a minimum amount of waste.

In addition, liquid soil conditioner or weed killer can be distributed. The sprinkling system may be made of metal which is suitably welded or bolted or otherwise fastened together to form a ridge frame structure to which the sprinkler pipe is firmly secured. Sprinkler heads such as the heads 74 may be spaced or arranged at regular intervals to provide for even distribution over the land. The sprinkling system will move under its own power over different kinds of terrain or soil and it may be powered with a gasoline or electric motor. The sprinkling system will travel in a straight direction or it will travel in a circular direction over irregular shaped fields. Various optional attachments or accessories can be quickly mounted thereon without the use of any special tools. A self-propelled drive is provided on the sprinkler for moving the sprinkler from one tract of land to an adjacent tract of land. The wheels or stations are placed at regular intervals depending upon the length of pipe as desired or required. The device will travel in a forward or reverse direction by a reverse and forward transmission that is mounted on a power station such as station 75. The sprinkler pipe has a sprinkler head mounted on the end of each joint of pipe causing an even distribution of water.

Angle braces can be provided adjacent to the traveling chains to function as safety guard for the chains. The cable tower 52 is attached to the risers 41 and has cables 56 extending from the clamp 58 to the anchors 57 on the pipe 48, and the anchors 57 also serve as hangers for the drive line or shaft 42. The pair of release mechanisms 76 and 77 on each station 21 are interconnected together so that one mechanism 76 will be free-wheeling while the other is operative, and the purpose of this free-wheeling arrangement is to bypass poles, trees or other objects that might be in the path of the sprinkler. In order to bypass an object the pipe 48 can be disconnected from the header bar 47 and the station can be positioned past the object and the parts can be reconnected. In the same manner stations can be dropped off one at a time to get into triangular shaped tracts of land. Because the wheels 33 can be shifted into and out of the right angled position relative to a desired direction, the sprinkler can move from one tract of land to an adjacent tract of land with ease and rapidity.

FIGS. 11 and 12 illustrate the circular drive for the sprinkler and by operating a sprocket such as the sprocket 66 with the clutch 90 together with the timed cam 100, the hub element 88 will be disengaged at regular intervals causing the sprinkler to travel in a circle. As the cam 100 rotates and contacts the roller 98, this will disengage the clutch end 88 from the clutch end 89 so as to cause the drive line or shaft 42 to free wheel while the next station moves ahead.

In addition, a pivot station and swivel hook hub base can be anchored to the ground by driving stakes into the ground so as to permit a station to swivel and with a pipe having a swivel joint from a main source, the main water source can be hooked or connected to the sprinkler line.

Also, the sprinkler system can be used with tracks attached to cleat elements so as to provide a crawler type of system, and the tracks can either have a cleat arrangement for rough steep terrain or a sprocket feed for deep sandy soil or the like.

As a further modification, certain of the parts such as the frame and riser may be cut down to carry the sprinkler pipe close to the ground, and wheels or pads can be used instead of the cleat type elements and such a unit may be gear driven. Such an arrangement with a low frame can be used for advantageously irrigating grass land sod fields. In addition, the present invention may use a low gear driving unit.

With reference to FIG. 13, the length of the riser 41 may be substantially reduced by locating the jack shaft 42 closely adjacent to the frame member 22. In this modification, a drive gear 110 is mounted on the jack shaft 42 and such gear member with a pair of driven gears 111 fixed to the shafts 36 to provide a direct drive from the jack shaft to the gear members 38 which drive the wheels 33. The drive gear 110 is mounted on the jack shaft 42 in the same manner as sprockets 45 and 66 and controlled by the release mechanisms 76 and 77 as previously described.

Minor changes in shape, size and rearrangement of details coming within the field of invention claimed may be resorted to in actual practice, if desired.

What is claimed is:
1. A self-propelled sprinkler comprising a plurality of stations, each including a horizontally disposed frame member, a frame element secured to said frame member, swivel rings mounted below the ends of said frame member, securing elements connecting said rings to said frame member, and said rings having grooves therein, an axle engaging the grooved portions of said rings, a wheel connected to each axle, a securing element affixed to said axle and extending through said ring and frame member, said wheel having an internal gear member, a drive shaft having sprocket members, gear elements integral with said sprocket members, and said gear elements adapted to selectively mesh with said gear members, a vertically disposed riser having its lower end affixed to said frame member, a horizontally disposed elongated jack shaft extending through said riser and including a plurality of shaft sections coupled together, a pair of release mechanisms for each station and one of said release mechanisms including a sprocket element, an endless chain trained over said sprocket element and sprocket members, a horizontally disposed header bar connected to said riser, an elongated horizontally disposed sprinkler pipe arranged over said header bar and detachably connected thereto, a cable tower connected to the upper end of said riser, cables connected to said tower and said cables being operatively connected to said sprinkler pipe and jack shaft; a horizontally disposed shaft member having its longitudinal axis parallel to said frame member, gear members on the ends of said shaft member for selective engagement with the gear members of said wheels, a driven shaft operatively connected to said jack shaft by means of a chain and sprocket mechanism, intermeshing bevel gears on said driven shaft and shaft member, manually operative levers for releasing said mechanism, one of said stations having an engine thereon, means operatively connecting said engine to said jack shaft, and sprinkler heads connected to said sprinkler pipe.

References Cited

UNITED STATES PATENTS 3,245,608   4/1966   Purtell _____ 239—212
3,361,360   1/1968   Purtell _____ 239—212

SAMUEL F. COLEMAN, Primary Examiner

U.S. Cl. X.R.

137—344